(12) United States Patent
Yang et al.

(10) Patent No.: US 11,615,589 B2
(45) Date of Patent: Mar. 28, 2023

(54) METHOD AND GRAPHICS PROCESSING SYSTEM FOR RENDERING ONE OR MORE FRAGMENTS HAVING SHADER-DEPENDENT PROPERTIES

(71) Applicant: Imagination Technologies Limited, Kings Langley (GB)

(72) Inventors: Xile Yang, Rickmansworth (GB); Christopher Plant, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 91 days.

(21) Appl. No.: 17/363,492

(22) Filed: Jun. 30, 2021

(65) Prior Publication Data
US 2021/0407191 A1  Dec. 30, 2021

(30) Foreign Application Priority Data
Jun. 30, 2020  (GB) .................................... 2010003

(51) Int. Cl.
*G06T 17/10* (2006.01)
*G06T 1/20* (2006.01)
(Continued)

(52) U.S. Cl.
CPC ............. *G06T 17/10* (2013.01); *G06T 1/20* (2013.01); *G06T 15/005* (2013.01); *G06T 15/40* (2013.01)

(58) Field of Classification Search
None
See application file for complete search history.

(56) References Cited

U.S. PATENT DOCUMENTS 10,074,210 B1  9/2018  Spencer et al.
2016/0217608 A1*  7/2016  Howson ............... G06T 15/405
(Continued)

FOREIGN PATENT DOCUMENTS

EP  3051496 A1  8/2016
GB  2516358 A  1/2015

OTHER PUBLICATIONS

Chan et al, 'Efficient Partitioning of Fragment Shaders for Multipass Rendering on Programmable Graphics Hardware', Graphics Hardware, pp. 69-78. (Year: 2002).*

*Primary Examiner* — Patrick F Valdez
(74) *Attorney, Agent, or Firm* — Potomac Law Group, PLLC; Vincent M DeLuca

(57) ABSTRACT

A graphics processing unit and method for processing fragments in a graphics processing system which includes: (i) hidden surface removal logic configured to perform hidden surface removal on fragments, and (ii) processing logic configured to execute shader programs for fragments. Initial processing of fragments is performed at the hidden surface removal logic. Some of the fragments have a shader-dependent property. A shader program for a particular fragment having the shader-dependent property is split into two stages. The initial processing comprises performing a depth test on the particular fragment. In response to the particular fragment passing the depth test of the initial processing in the hidden surface removal logic, a first stage, but not a second stage, of the shader program is executed for the particular fragment at the processing logic. The first stage of the shader program has instructions for determining the property of the particular fragment.

20 Claims, 5 Drawing Sheets

(51) Int. Cl.
    *G06T 15/00*    (2011.01)
    *G06T 15/40*    (2011.01)

(56) References Cited

U.S. PATENT DOCUMENTS

| | | |
|---|---|---|
| 2019/0066356 A1 | 2/2019 | Gierach et al. |
| 2019/0206110 A1* | 7/2019 | Gierach ................ G06T 15/005 |
| 2019/0304056 A1 | 10/2019 | Grajewski et al. |

* cited by examiner

METHOD AND GRAPHICS PROCESSING SYSTEM FOR RENDERING ONE OR MORE FRAGMENTS HAVING SHADER-DEPENDENT PROPERTIES

FIELD

This disclosure relates to graphics processing. In particular, this disclosure relates to methods and graphics processing systems for rendering one or more fragments having shader-dependent properties.

BACKGROUND

Graphics processing systems are used to process graphics data in order to render images of scenes. Surfaces of objects within the scene to be rendered can be described using items of geometry, which may for example be primitives or patches. Primitives tend to be simple geometric shapes, such as triangles, lines or points, and can be defined by data (e.g. position and attribute data) associated with the vertices of the primitives. In contrast, patches tend to be used to represent more complex (e.g. non-planar) surfaces, and can be processed by performing tessellation in order to determine tessellated primitives which approximately represent the patch, and which can then be processed in the graphics processing system.

FIG. 1 shows a graphics processing system 100 which can be used to process graphics data to render an image of a scene. The graphics processing system 100 comprises a graphics processing unit (GPU) 102 which comprises geometry processing logic 104 and rendering logic 106. The graphics processing system 100 also comprises a memory 108 and a compiler 110. It is noted that although the memory 108 is shown as a single block of memory in FIG. 1, this is for illustrative purposes only, and the memory 108 may be made up of multiple blocks of memory. The geometry processing logic 104 comprises pre-processing logic 112 and tiling logic 114. The rendering logic 106 comprises a fetch unit 116, rasterization logic 118, hidden surface removal logic 120, a depth buffer 122, a tag buffer 124 and processing logic 126. The rendering logic 106 may further comprise post-processing logic 128, which may be referred to as a "pixel back end" or "PBE". In general, the logic blocks and units described herein may be implemented in hardware (e.g. fixed-function circuitry), software (e.g. as software code running on a processor) or a combination of both. However, the processing logic 126 shown in FIG. 1 is configured to execute computer software programs (e.g. "shader programs"). For example, the processing logic 126 may be a Single Instruction Multiple Data (SIMD) processing unit configured to execute a single instruction on multiple data items in parallel. Methods of performing SIMD processing are known in the art.

The graphics processing system 100 shown in FIG. 1 is a tile-based rendering system, but this is just described as an example, and it is noted that other graphics processing systems are not tile-based. In the tile-based graphics processing system 100, the 2D rendering space in which images are rendered is subdivided into a plurality of tiles. In operation, there are two phases: (i) a geometry processing phase in which the geometry processing logic 104 performs geometry processing to process primitives or other items of geometry, such as patches, and (ii) a rendering phase in which the rendering logic 106 performs fragment processing on fragments to determine rendered values, e.g. rendered pixel values representing an image.

For example, in the geometry processing phase, the pre-processing logic 112 transforms the primitives (e.g. the vertices of the primitives) into the rendering space. The pre-processing logic 112 also performs processes such as clipping and culling on primitives which are outside of a view frustum representing a viewable region of the scene from the viewpoint from which the scene is being rendered. The tiling logic 114 then determines which primitives are relevant for rendering which tiles of the rendering space. The tiling logic 114 can generate tile control lists which indicate, for each tile, which primitives are relevant for rendering that tile (i.e. which primitives are present within that tile). The transformed primitive data (describing the transformed primitives in rendering space) and the tile control lists are stored in the memory 108.

Then in the rendering phase the fetch unit 116 fetches the tile control list for a tile from the memory 108 and fetches the transformed primitive data which is indicated in the tile control list for the tile from the memory 108. The transformed primitive data (e.g. vertex data for transformed primitives) is passed to the rasterization logic 118 which performs rasterization (which may be referred to as "scan conversion" or "sampling") on the transformed primitive data to determine primitive fragments at sample positions within the tile that is currently being processed in the rendering logic 106. As a matter of terminology, a "fragment" is an element of a primitive at a sample position. A sample position may correspond to a pixel position of a pixel for an image being rendered, but in some examples each pixel position may correspond to multiple sample positions, wherein each pixel value can be determined by combining multiple processed fragment values. This can be useful in some situations, e.g. to perform anti-aliasing, but it does increase the amount of processing performed in the rendering logic 106.

The GPU 102 shown in FIG. 1 is configured to perform deferred rendering. Other GPUs can be configured to perform non-deferred rendering. In a deferred rendering technique, hidden surface removal is performed on fragments before texturing and/or shading is performed on the fragments. Shading can be performed in respect of a fragment by executing a shader program to determine a shaded fragment. This shaded fragment may represent a rendered value for the sample position of the shaded fragment. Shader programs are generally written in software, so users can define how they want the fragments to be shaded. Often, a shader program can involve applying a texture to a fragment. This texturing process involves sampling a texture, e.g. fetching texture data from the memory 108 and sampling the texture at a particular position (which often involves performing interpolation on the texel values defining the texture). Fetching texture data from memory often takes many processing cycles, and sampling the texture can involve complex calculations, so texturing is an expensive process (in terms of latency and power consumption). Furthermore, shader programs often involve other complex instructions too. In a non-deferred rendering system, the shader programs would typically be executed for all of the rasterized fragments, and then hidden surface removal would be applied to determine which of those shaded fragments is visible at each sample position. Often, there can be many layers of overlapping fragments from different objects in a scene being rendered, so many (e.g. well over half) of the fragments may be occluded. Therefore, a lot of the processing performed in a non-deferred rendering system involves shading fragments which have no effect on the final rendered values because they are occluded.

Deferred rendering systems aim to reduce the amount of processing that is performed (compared to non-deferred rendering systems) by performing hidden surface removal before the shading and/or texturing. Therefore, as shown in FIG. 1, the fragments outputted from the rasterization logic 118 are processed by the hidden surface removal (HSR) logic 120, thereby removing occluded fragments. The hidden surface removal performed on a fragment by the HSR logic 120 comprises performing a depth test on the fragment against a corresponding depth value stored in the depth buffer 122. The depth buffer stores a depth value for each sample position in the tile being processed. The tag buffer 124 stores a primitive ID for each sample position in the tile being processed. If the fragment passes the depth test then the depth value of the fragment is used to update the depth value for the corresponding sample position in the depth buffer 122, and the primitive ID of the primitive that the fragment relates to is stored at the corresponding sample position in tag buffer 124. The depth value and primitive ID may overwrite any previously stored values at the sample position. Therefore, the depth buffer 122 keeps track of the current visible depth value at each sample position in the tile, and the tag buffer 124 keeps track of an ID of the primitive which is present at each sample position in the tile. If all of the fragments are opaque then all of the fragments in the tile can be processed by the HSR logic 120, such that the tag buffer 124 then stores, for each sample position, the primitive ID of the primitive which has a fragment visible at that sample position. The tag buffer 124 can then be "flushed", i.e. the primitive IDs in the tag buffer 124 can be sent to the processing logic 126 where shader programs can be executed (e.g. in a SIMD manner) for the visible fragments at the respective sample positions. The execution of a shader program for a fragment at the processing logic 126 generates a shaded fragment. If no further processing is to be performed in respect of the sample position of the shaded fragment, then the shaded fragment represents a rendered value for the sample position. The rendered values can be written out from the processing logic 126 to the memory 108 (e.g. to a frame buffer in the memory 108). The post-processing logic 128 may perform some post-processing, such as rotation or blending, on the shaded fragments output from the processing logic 126 before the rendered values are output to the memory 108. If all fragments are opaque, the tag buffer 124 only has to be flushed once per tile, and in that case the depth buffer 122 is reset ready for the next tile.

This deferred rendering system works very well for opaque fragments (i.e. fragments of opaque objects, or in other words fragments associated with an opaque object type) because shading only needs to be performed for fragments which are not occluded. However, not all objects are opaque. Some objects may be translucent, and some objects may be referred to as "punch through" objects. Fragments of "punch through" objects have shader-dependent presence. As described below, the "presence" referred to here is presence of fragments in the primitive, rather than for example presence in a final image, where other factors, such as occlusion, may apply. Terms other than "punch through" may sometimes be used in the art to refer to objects for which fragments have shader-dependent presence, but the term "punch through" is used herein to refer to these types of objects. Punch through objects can be very useful for representing fine edge or shape detail at a scale smaller than is efficiently representable using triangles/primitives, e.g. for representing objects with holes in them. If a fragment has a shader-dependent presence this means that the presence of the fragment is determined by the shader program which is executed for the fragment. For example, the code of the shader program may include a "discard" instruction to discard some of the fragments in a primitive. For example, the discard operation may be based on the alpha channel of a texture which is applied to the fragments. Therefore, in the deferred rendering system 100 shown in FIG. 1, when a punch through fragment (i.e. a fragment with shader-dependent presence) is received at the hidden surface removal logic 120 from the rasterization logic 118, the presence of the fragment is not known. Fragments associated with a punch through object type should be processed by the HSR logic 120 such that it is possible to see through the holes left after the removal of any fragments that are determined not to be present, i.e. after those fragments have been discarded. Therefore, if the fragment passes a depth test in the HSR logic 120 then, since the fragment might not be present, the depth buffer 122 and the tag buffer 124 cannot be updated by simply overwriting the stored values without risking introducing artefacts into the rendered values. If the punch through fragment, having passed the depth test, is determined to overlap with another fragment already in the tag buffer 124, then the tag buffer 124 is flushed thereby sending the primitive IDs from the tag buffer 124 to the processing logic 126. The primitive ID of the punch-through fragment may then be stored in the tag buffer. The tag buffer may also be flushed after processing the last punch through fragment, or on receipt of the first fragment of a new object type at the HSR logic 120. The processing logic 126 executes shader programs for the fragments flushed from the tag buffer 124. The execution of the shader program for the punch through fragment determines the presence or non-presence of the fragment. For fragments determined to be present, the processing logic 126 then provides information to the hidden surface removal logic 120 to indicate the presence of the fragment and then waits for feedback from the hidden surface removal logic 120. If a fragment is determined by the processing logic 126 to be not present (e.g. if it is discarded by the execution of the shader program at the processing logic 126) then in some examples, an indication of this 'non-presence' may be provided from the processing logic 126 to the hidden surface removal logic 120, but in some other examples the processing logic 126 might not provide an indication of 'non-presence' back to the hidden surface removal logic 120. If the punch through fragment was not discarded by the shader program, then the hidden surface removal logic 120 performs another depth test on the fragment because the HSR logic may have been processing other fragments in the time since the punch through fragment was flushed from the tag buffer), and, as the presence of the punch through fragment is now known, the depth buffer can be updated as normal and the result of the depth test can be fed back to the processing logic 126. When the processing logic 126 receives this feedback it can continue to process the fragment if the fragment passed the depth test, or it can discard the fragment if the fragment failed the depth test. As mentioned above, the processing logic 126 may be configured to operate in a SIMD manner, such that groups of fragments are processed in parallel. The processing logic 126 pauses the processing of a whole group of fragments whilst it waits for the feedback from the HSR logic 120 in relation to fragments of that group. In some cases, the shaded fragments might have been produced but the processing logic 126 waits for the feedback from the HSR logic 120 in order to determine what to do with the shaded fragments, while in other cases the processing logic 126 pauses execution of the shader program (e.g. deschedules it) while it waits for the feedback from the HSR logic 120.

"Tags" stored in the tag buffer 124 are primitive identifiers which associate a fragment with the primitive of which it is a part, and which allow attributes such as texturing and shading data for the primitive to be fetched when required. The tag buffer 124 is used to hold tags for fragments from the front most primitives (e.g. those fragments which pass the depth test) for each sample position in the part of the rendering space currently being processed (e.g. in a tile when the system 100 is a tile-based system). Tags for opaque fragments which pass the depth tests are typically written into the tag buffer 124 even if they overwrite an existing tag. Fragments from translucent and punch through primitives may need to be combined with fragments that they overdraw. The combining of these fragments typically must be performed in the order that they were submitted by the application. As such, whenever translucent or punch through fragments are found to lie in front of fragments currently stored within the tag buffer 124, the HSR logic 120 flushes currently stored tags to the processing logic 126. As described above, in the case of punch through fragments, the presence of fragments, and hence whether their depth values should be updated in the depth buffer 122, is determined by the shader programs executed at the processing logic 126. Therefore, tags for punch through primitives must also be sent for processing by the processing logic 126 after any tags currently stored within the tag buffer 124 have been flushed. It is noted that the combination of a tag and a position in the tag buffer 124 defines a fragment, so the flushing of tags from the tag buffer 124 can be considered to be flushing fragments from the tag buffer 124. Conceptually, it makes sense to consider fragments being stored in the tag buffer 124 and fragments being flushed out to the processing logic 126. In a practical implementation, this conceptual flow of fragments is embodied by storing tags in the tag buffer 124 and flushing tags from the tag buffer 124.

Making the processing logic 126 wait (or "stall") during the processing of punch through fragments introduces latency into the graphics processing system 100. This can cause a significant delay compared to processing opaque fragments, e.g. if the execution of the shader programs involves performing complex calculations (e.g. reciprocal square root calculations) and texture fetches from external memory. Furthermore, resources of the GPU 102, e.g. registers, are tied up by the task that is waiting for feedback, and so are not available to other tasks.

Furthermore, the processing of punch through fragments (i.e. fragments with shader-dependent presence) in deferred rendering systems, such as system 100, causes further reductions in processing efficiency to those described above. For example, punch through fragments that are subsequently overdrawn by opaque fragments are shaded by the processing logic 126 even though they will not contribute to the final rendered image, hence there is unnecessary processing being performed by the GPU 102. Furthermore, opaque fragments which follow punch through fragments cannot be processed by the HSR logic 120 until indications of the presence of the punch through fragments have been returned from the processing logic 126 to the HSR logic 120 and the depth buffer 122 has been updated accordingly, so there may be a stall in the processing while the presence and the depth values of the punch through fragments are resolved.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a method of processing fragments in a graphics processing system which comprises: (i) hidden surface removal logic configured to perform hidden surface removal on fragments, and (ii) processing logic configured to execute shader programs for fragments, the method comprising:

performing initial processing of fragments at the hidden surface removal logic, wherein one or more of the fragments have a shader-dependent property, wherein a shader program for a particular one of the one or more fragments having the shader-dependent property is split into two stages, and wherein said initial processing comprises performing a depth test on said particular fragment which has the shader-dependent property; and in response to the particular fragment passing the depth test of the initial processing in the hidden surface removal logic, executing a first stage, but not a second stage, of the shader program for the particular fragment at the processing logic, wherein the first stage of the shader program comprises one or more instructions for determining the property of the particular fragment.

The method may further comprise performing further processing of the particular fragment at the hidden surface removal logic in accordance with the determined property of the particular fragment determined by the execution of the first stage of the shader program.

The method may further comprise:
if the particular fragment survives the further processing in the hidden surface removal logic, executing the second stage of the shader program for the particular fragment at the processing logic, wherein a rendered value is determined in accordance with a result of executing the second stage of the shader program for the particular fragment.

The further processing of the particular fragment at the hidden surface removal logic may comprise:
performing a depth test on the particular fragment, and
if the particular fragment passes the depth test, updating a depth buffer and a tag buffer which are to be used by the hidden surface removal logic to process subsequent fragments.

The further processing of the particular fragment at the hidden surface removal logic may further comprise:
processing the subsequent fragments by performing depth tests on the subsequent fragments and updating the depth buffer and the tag buffer based on the results of the depth tests on the subsequent fragments,
determining that the tag buffer should be flushed, and in response thereto, flushing the tag buffer thereby sending data from the tag buffer to the processing logic to cause second stages of shader programs to be executed at the processing logic for fragments indicated by the data sent from the tag buffer.

Said determining that the tag buffer should be flushed may comprise:
determining that all of the fragments for a portion of a rendering space have been processed by the hidden surface removal logic; or
determining that a translucent fragment is overlapping a fragment identified in the tag buffer.

The method may further comprise setting an object type for the particular fragment to be opaque or translucent with known presence for said further processing of the particular fragment in the hidden surface removal logic.

The initial processing at the hidden surface removal logic may not comprise updating a depth buffer or a tag buffer based on the result of the depth test performed on the particular fragment in the initial processing at the hidden surface removal logic.

The shader-dependent property may be shader-dependent presence.

Said performing further processing of the particular fragment at the hidden surface removal logic in accordance with the determined property of the particular fragment determined by the execution of the first stage of the shader program may comprise:
  if the execution of the first stage of the shader program determines that the particular fragment is present, performing further processing of the particular fragment at the hidden surface removal logic on the basis that the particular fragment is present.

If the execution of the first stage of the shader program determines that the particular fragment is not present then the second stage of the shader program may not be executed for the particular fragment.

The shader-dependent property may be shader-dependent depth.

The shader program for the particular fragment may be split at a point after a final instruction in the shader program which can affect the shader-dependent property of a fragment.

The final instruction which can affect the shader-dependent presence may be a discard instruction.

The final instruction which can affect the shader-dependent depth may be an instruction for modifying the depth of a fragment.

A compiler may analyse the shader program for the particular fragment to determine whether to split the shader program into two stages.

The compiler may determine whether any data from the first stage of the shader program is used in the second stage of the shader program, wherein if the compiler determines that data from the first stage of the shader program is used in the second stage of the shader program then the method may further comprise either:
  (i) storing said data from the first stage of the shader program and retrieving said stored data for use when executing the second stage of the shader program, or
  (ii) re-executing the first stage of the shader program when the second stage of the shader program is to be executed.

The compiler may decide, prior to starting a render which involves executing the shader program, which of options (i) and (ii) is to be performed.

The graphics processing system may decide, during a render which involves executing the shader program, which of options (i) and (ii) is performed based on current conditions of the graphics processing system.

The current conditions of the graphics processing system may comprise a current usage of registers which are configured to store data from the first stage of the shader program.

There is provided a graphics processing unit configured to process fragments, the graphics processing unit comprising:
  hidden surface removal logic configured to perform hidden surface removal on fragments, wherein one or more of the fragments have a shader-dependent property; and
  processing logic configured to execute shader programs for fragments, wherein a shader program for a particular one of the one or more fragments having the shader-dependent property is split into two stages;
  wherein the graphics processing unit is configured to:
    perform initial processing of fragments at the hidden surface removal logic, wherein said initial processing comprises performing a depth test on said particular fragment which has the shader-dependent property; and
    execute a first stage, but not a second stage, of the shader program for the particular fragment at the processing logic in response to the particular fragment passing the depth test of the initial processing in the hidden surface removal logic, wherein the first stage of the shader program comprises one or more instructions for determining the property of the particular fragment.

The graphics processing unit may be further configured to perform further processing of the particular fragment at the hidden surface removal logic in accordance with the determined property of the particular fragment determined by the execution of the first stage of the shader program.

The graphics processing unit may be further configured to:
  execute the second stage of the shader program for the particular fragment at the processing logic if the particular fragment survives the further processing in the hidden surface removal logic; and
  determine a rendered value in accordance with a result of executing the second stage of the shader program for the particular fragment.

The graphics processing unit may further comprise:
  a depth buffer coupled to the hidden surface removal logic and configured to store depth values for a plurality of sample positions within a rendering space; and
  a tag buffer coupled to the hidden surface removal logic and configured to store primitive identifiers for the plurality of sample positions;
  wherein the hidden surface removal logic is configured to, as part of the further processing of the particular fragment:
    perform a depth test on the particular fragment, and
    if the particular fragment passes the depth test, update the depth buffer and the tag buffer.

The graphics processing unit may be configured to perform tile-based rendering using a rendering space which is subdivided into a plurality of tiles, the graphics processing unit may further comprise:
  rasterization logic configured to perform rasterization on primitives to generate the fragments;
  geometry processing logic configured to generate, for each of a plurality of tiles, a control list which indicates which of a plurality of primitives are relevant for rendering that tile; and
  rendering logic comprising said hidden surface removal logic and said processing logic, wherein the rendering logic is configured to receive the control list for a tile and to process the primitives indicated in the control list for the tile using the hidden surface removal logic and the processing logic.

There is provided a graphics processing unit configured to perform any of the methods described herein.

There is provided a method of analysing a shader program which is for execution in a graphics processing system which comprises: (i) hidden surface removal logic configured to perform hidden surface removal on fragments, and (ii) processing logic configured to execute shader programs for fragments, wherein one or more of the fragments has a shader-dependent property, the method comprising:
  identifying an instruction in the shader program which can affect the shader-dependent property of a fragment;
  splitting the shader program into stages by splitting the shader program at a point after the identified instruction in the shader program; and
  storing the stages of the shader program in a memory, wherein the graphics processing system can read the stages of the shader program from the memory.

The shader program may be split into two stages, and wherein the identified instruction is the final instruction in the shader program which can affect the shader-dependent property of a fragment.

The point at which the shader program is split may be a point immediately after the identified instruction in the shader program.

The graphics processing system may be able to read the stages of the shader program from the memory separately.

The shader-dependent property may be shader-dependent presence, and wherein the instruction which can affect the shader-dependent presence may be a discard instruction.

The shader-dependent property may be shader-dependent depth, and wherein the instruction which can affect the shader-dependent depth may be an instruction for modifying the depth of a fragment.

The method may be performed prior to starting a render which involves executing the shader program on the graphics processing system.

The method may further comprise determining whether any data from a first stage of the shader program is used in a second stage of the shader program.

It may be the case that, if data from the first stage of the shader program is used in the second stage of the shader program then, during execution of the shader program by the graphics processing system, either:
  (i) said data from the first stage of the shader program is stored, and said stored data is retrieved for use when executing the second stage of the shader program, or
  (ii) the first stage of the shader program is re-executed when the second stage of the shader program is to be executed,
  wherein if it is determined that data from the first stage of the shader program is used in the second stage of the shader program then the method may further comprise deciding, prior to starting a render which involves executing the shader program, which of options (i) and (ii) is to be performed by the graphics processing system.

It may be the case that, if data from the first stage of the shader program is used in the second stage of the shader program then, during execution of the shader program by the graphics processing system, either:
  (i) said data from the first stage of the shader program is stored, and said stored data is retrieved for use when executing the second stage of the shader program, or
  (ii) the first stage of the shader program is re-executed when the second stage of the shader program is to be executed,
  wherein if it is determined that data from the first stage of the shader program is used in the second stage of the shader program then the method may further comprise providing a metric for use by the graphics processing system in deciding, during runtime, which of options (i) and (ii) to perform.

There is provided a compiler configured to analyse a shader program which is for execution in a graphics processing system which comprises: (i) hidden surface removal logic configured to perform hidden surface removal on fragments, and (ii) processing logic configured to execute shader programs for fragments, wherein one or more of the fragments has a shader-dependent property, the compiler being configured to:
  identify an instruction in the shader program which can affect the shader-dependent property of a fragment;
  split the shader program into stages by splitting the shader program at a point after the identified instruction in the shader program; and
  store the stages of the shader program in a memory, wherein the graphics processing system can read the stages of the shader program from the memory.

The graphics processing unit may be embodied in hardware on an integrated circuit. There may be provided a method of manufacturing, at an integrated circuit manufacturing system, the graphics processing unit. There may be provided an integrated circuit definition dataset that, when processed in an integrated circuit manufacturing system, configures the system to manufacture the graphics processing unit. There may be provided a non-transitory computer readable storage medium having stored thereon a computer readable description of an integrated circuit that, when processed in an integrated circuit manufacturing system, causes the integrated circuit manufacturing system to manufacture an integrated circuit embodying the graphics processing unit.

There may be provided an integrated circuit manufacturing system comprising: a non-transitory computer readable storage medium having stored thereon a computer readable integrated circuit description that describes the graphics processing unit; a layout processing system configured to process the integrated circuit description so as to generate a circuit layout description of an integrated circuit embodying the graphics processing unit; and an integrated circuit generation system configured to manufacture the graphics processing unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings.

Figure 1:
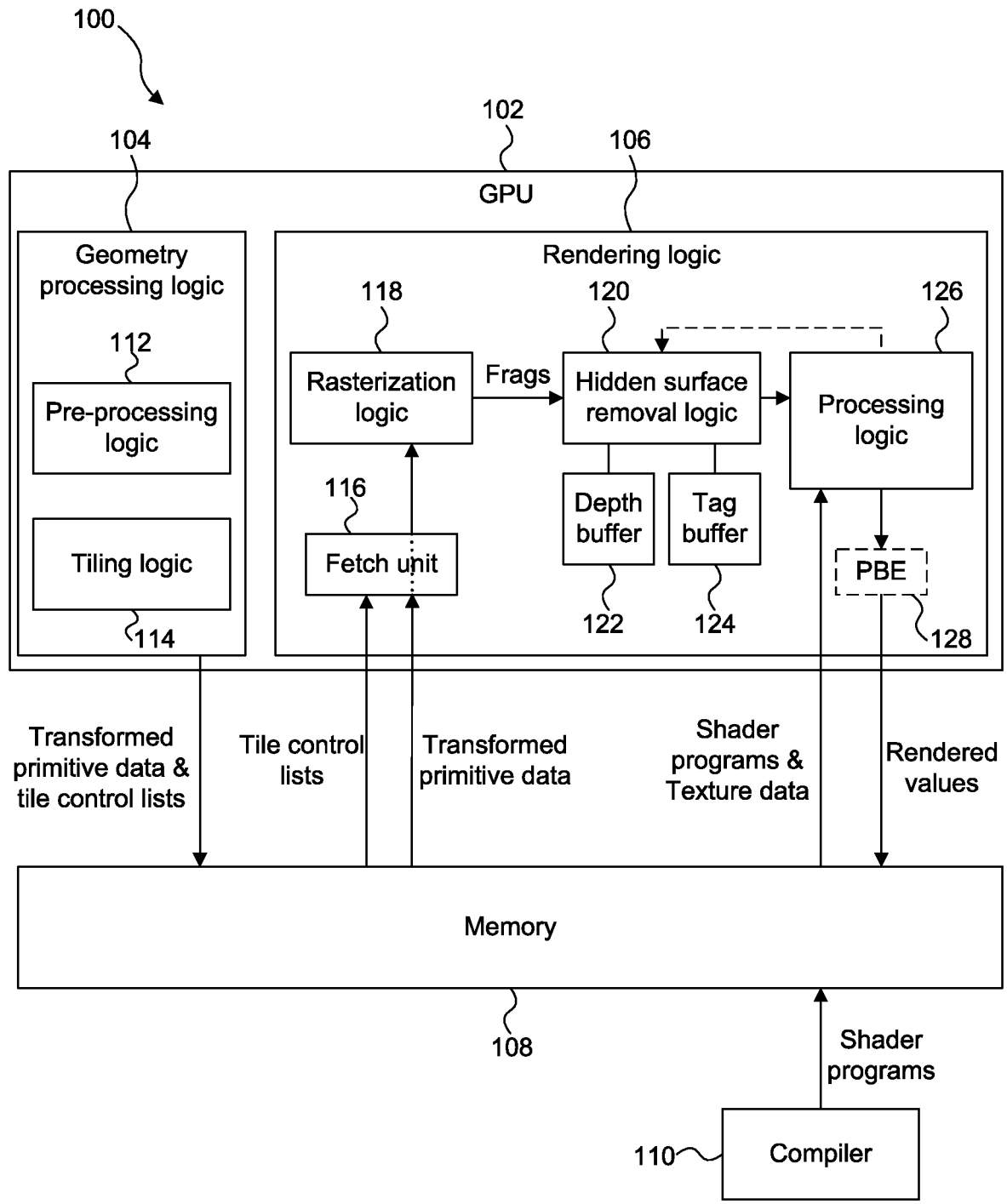
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Examples described herein are implemented using a graphics processing system having the same high-level structure as that shown in FIG. 1. However, in examples described herein shader programs for fragments which have a shader-dependent property are split into two stages. In particular, the "shader-dependent properties" described herein are properties of fragments that are dependent upon the execution of the shader program and which are relevant for the processing performed by the hidden surface removal logic. In other words, the shader-dependent property of a fragment affects the processing performed on the fragment by the hidden surface removal logic. For example, the shader-dependent property of a fragment may be relevant for performing depth testing at the hidden surface removal logic. In the examples described in detail herein, the shader-dependent property is shader-dependent presence, but it is to be understood that in other examples, the same techniques could be used for processing fragments with different shader-dependent properties, e.g. shader-dependent depths.

In the examples described in detail herein, shader programs for punch through fragments (i.e. fragments with shader-dependent presence) are split into two stages. For the sake of clarity, this document discusses, "splitting a shader program into two stages", but it will be clear to the skilled person that this covers splitting the shader program into two or more stages. For example, the compiler 110 can split the shader program for a punch through fragment into two stages before runtime, i.e. prior to the start of a render. In examples described herein, the shader program for a punch through fragment includes a discard instruction. The first stage ends after (e.g. immediately after) the discard instruction (or the final discard instruction if there are multiple discard instructions in the shader program), so that the first stage of the shader program includes the instructions necessary to determine whether or not a fragment will be discarded. The first stage of the shader program might not include any more than the instruction(s) for determining the presence of a fragment. The rest of the shader program, which is not included in the first stage of the shader program, is included in a second stage of the shader program. If a punch through fragment which has been received at the HSR logic 120 from the rasterization logic 118 passes a depth test at the HSR logic 120 then the fragment is provided to the processing logic 126, and the processing logic executes the first stage of the shader program for the fragment in order to determine the presence of the fragment. The result of this determination may then be passed back to the HSR logic 120, and if the fragment has been determined to be present, then the HSR logic 120 processes the fragment on the basis that its presence is known (e.g. it can be processed as an opaque or translucent fragment). On the first pass of a punch through fragment through the HSR logic 120, neither the depth buffer 122 nor the tag buffer 124 are updated, but on the second pass through the HSR logic 122 the depth buffer and tag buffer 124 may be updated if the fragment passes the depth test in the second pass. If the fragment survives the second pass through the HSR logic 120, such that it is, at some point, flushed from the tag buffer 124 to the processing logic 126, then the processing logic 126 executes the second stage of the shader program for the fragment.

By splitting the shader program for a punch through fragment into two stages (or two "phases") as described above, the presence of a punch through fragment can be determined by the processing logic 126 without introducing as much latency into the feedback loop between the HSR logic 120 and the processing logic 126, compared to the system described in the background section above. Therefore, the latency of the GPU 102 is reduced when processing punch through objects. Furthermore, the complexity of managing fragments on their second pass through HSR logic is reduced, because on the second pass the object type of the fragments is changed to a non-punch through object type. There are effectively then fewer object type changes, so fewer times when the processing needs to stall objects of a different type from entering the HSR logic. For example, if the incoming primitives have a mixture of opaque and opaque-punch through object types then the processing will flow much faster through the HSR logic. Similarly, if the incoming primitives have a mixture of transparent and transparent-punch through object types then all of the transparent punch through fragments will become transparent fragments for the second pass. Once the object type of the punch through fragments is changed to a non-punch through object type then object type stalls and flushes will only occur on opaque-transparent transitions in object type. In examples described herein, the tag buffer 124 does not need to be flushed in order to determine the presence of a punch through fragment. Furthermore, it is noted that only a portion of the shader program (in particular, only the first stage of the shader program) needs to be executed in order to determine the presence of a punch through fragment. So compared to the system described in the background section above in which resources for the whole shader program would be allocated, the presence of a punch through fragment can be determined with reduced resource requirements (e.g. reduced temporary register allocation and a reduction in the bandwidth for the input variables), and those resources can be released after the execution of the first stage of the shader program. This allows more resources to be used for executing other tasks. Furthermore, this may result in the latency and power consumption of determining the presence of a punch through fragment being reduced.

Furthermore, when the results of the execution of the first stage of the shader program are fed back to the HSR logic 120, the HSR logic 120 then treats the fragment as if its presence is known. For example, the fragment may be processed as an opaque fragment. If this, now opaque, fragment passes the depth test in the second pass through the HSR logic 120 then it can overwrite values in the depth buffer 122 and in the tag buffer 124. None of the fragments in the tag buffer 124 have unresolved presence (or other shader-dependent properties). Furthermore, that fragment itself may be overwritten by a subsequent opaque fragment (or a punch through fragment that is being treated as an opaque fragment) before the tag buffer 124 is flushed. So, for both of these reasons, the number of times that tags are overwritten in the tag buffer 124 is increased. Increasing the number of times that tags are overwritten in the tag buffer 124 reduces the number of fragments which are flushed from the tag buffer 124 to the processing logic 126 and therefore reduces the amount of processing that the processing logic 126 has to perform, thereby improving the performance (e.g. speed) and reducing the power consumption of the GPU 102. To emphasise this point, if a particular fragment is determined to be present by the execution of the first stage of the shader program and then passes a depth test in the HSR logic 120, it may be written into the tag buffer 124. However, before the tag buffer 124 is flushed a subsequent opaque fragment (or a punch through fragment that is being treated as an opaque fragment) might overwrite the particular fragment in the tag buffer, such that the particular fragment is never flushed from the tag buffer 124 to the processing logic 126, and as such the second stage of the shader program for the particular fragment would never be executed. This reduces unnecessary processing being performed at the processing logic 126, because in this example the particular fragment is occluded by the subsequent opaque fragment so it does not contribute to the final rendered values, and hence there is no need to finish executing the shader program for the particular fragment (in particular, there is no need to execute the second stage of the shader program for the particular fragment).

A high-level description of a method of processing punch through fragments in the graphics processing system 100 will be described with reference to the flow chart of FIG. 2. It is noted that discard instructions normally occur at, or near, the start of a shader program for a punch through fragment, particularly for programs which have been optimised by a compiler such that this is the case. The discard instructions are used to selectively remove some of the fragments from the output of the shader program. The execution of instructions in the shader program after a discard instruction is only needed for the fragments which are not discarded by the discard instruction. As described above, the shader program for a punch through fragment (i.e. a fragment having shader-dependent presence) is split into two stages, wherein the first stage of the shader program comprises one or more instructions (e.g. including a discard instruction) for determining the presence of the fragment. The shader program may be split at a point after (e.g. immediately after) a final discard instruction in the shader program. If there is only a single discard instruction in the shader program then the final discard instruction is that single discard instruction; whereas, if the shader program includes a plurality of discard instructions then the final discard instruction is the one of those discard instructions which will be the last to be executed when the shader program is run. In other words, the end of the first stage is the earliest point at which the shader-dependent property has been resolved for all fragments. As described in more detail below, the compiler 110 may analyse the shader program, prior to starting a render which involves executing the shader program, to determine whether to split the shader program into two stages. The compiled shader programs are stored in the memory 108 and can be fetched from the memory 108 and passed to the processing logic 126 when they are to be executed.

Figure 2:
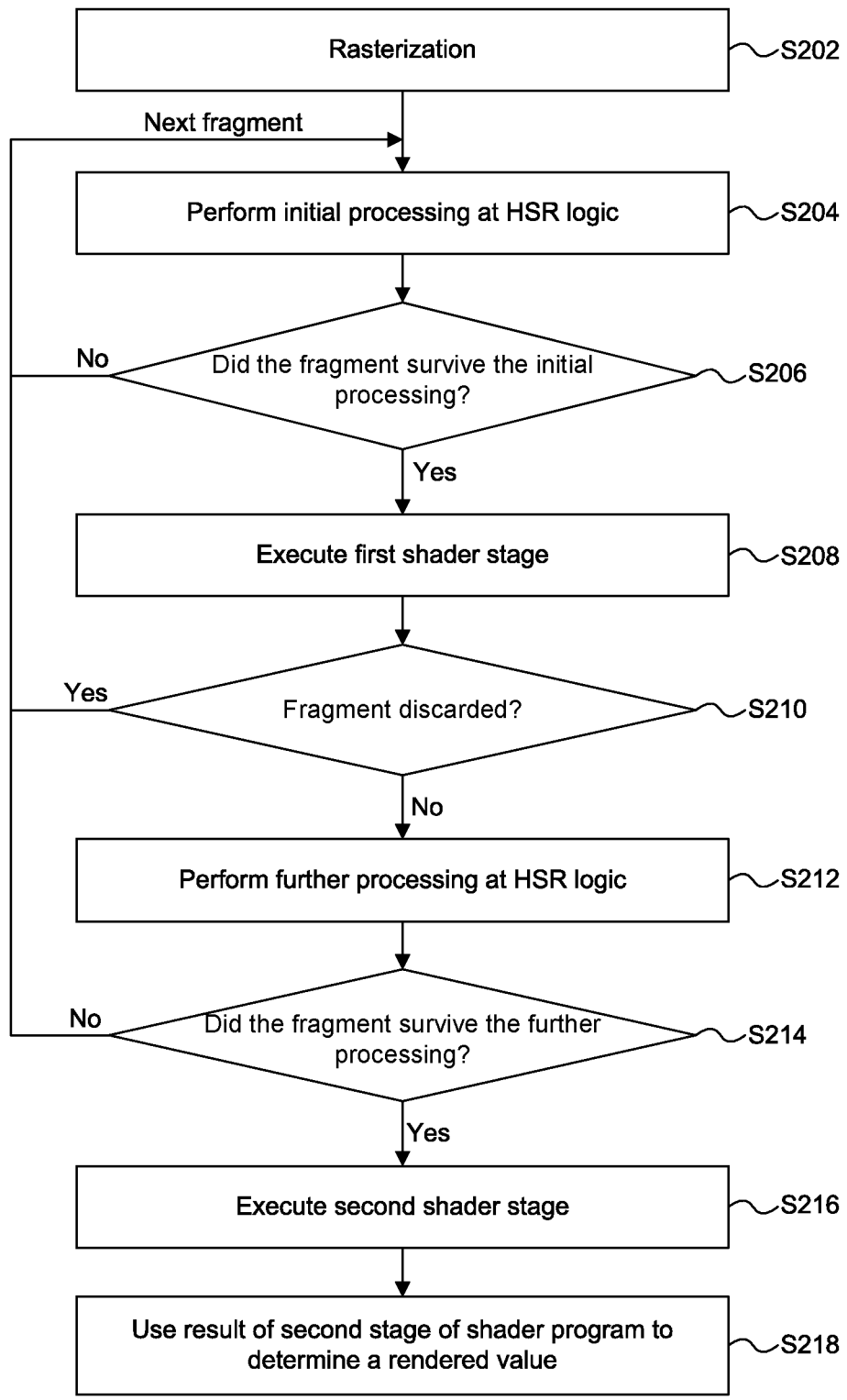
FIG. 2 is a flow chart for a method of processing punch through fragments in a graphics processing system.

The method shown in the flow chart of FIG. 2 describes processing performed by the rendering logic 106. In the example tile-based graphics processing system 100 shown in FIG. 1 it is noted that the geometry processing logic 104 will perform geometry processing to determine transformed primitive data and tile control lists, which are then stored in the memory 108 before the processing steps shown in FIG. 2 are performed by the rendering logic 106. The fetch unit 116 fetches the tile control list for a tile from the memory 108 and fetches the transformed primitive data which is indicated in the tile control list for the tile from the memory 108. The transformed primitive data (e.g. vertex data for transformed primitives) is passed to the rasterization logic 118.

In step S202 the rasterization logic 118 performs rasterization (which may be referred to as "scan conversion" or "sampling") on the transformed primitive data to generate fragments at sample positions within the tile that is currently being processed in the rendering logic 106. The fragments are passed to the HSR logic 120. As described above, a "fragment" is an element of a primitive at a sample position. The flow chart shown in FIG. 2 illustrates how a punch through fragment (i.e. a fragment having shader-dependent presence) is processed. It is noted that this is a simple example, and in some other examples groups of fragments may be processed in parallel in the HSR logic 120 and in the processing logic 126.

In step S204 initial processing of a punch through fragment is performed at the HSR logic 120. The initial processing comprises performing a depth test on the fragment. The depth test involves comparing a depth value of the fragment with a depth value at a corresponding sample position from the depth buffer 122 in accordance with a depth compare mode. For example, the depth compare mode may be a "less than" depth compare mode in which the fragment will pass the depth test if its depth value is less than the corresponding depth value stored in the depth buffer 122. In other examples, the depth compare mode may be a "greater than" depth compare mode in which the fragment will pass the depth test if its depth value is greater than the corresponding depth value stored in the depth buffer 122. Other depth compare modes are also known in the art. If the fragment fails the depth test then it is discarded. If the fragment passes the depth test then it is not discarded in the initial processing performed at the HSR logic 120, i.e. the fragment survives the initial processing. However, since the fragment is a punch through fragment (i.e. it is associated with a punch through object type) its presence is not yet known, so neither the depth buffer 122 nor the tag buffer 124 are updated in response to the fragment passing the depth test in the initial processing.

In step S206 it is determined whether the fragment survived the initial processing, e.g. whether the fragment passed the depth test. If the fragment did not survive the initial processing then it has been discarded and the method returns to step S204 to process another fragment (if there is another fragment to process). However, if the fragment did survive the initial processing then the fragment is provided to the processing logic 126 and the method passes to step S208. In other words, in response to the fragment passing the depth test of the initial processing in the HSR logic 120 the method passes to step S208. If the fragment "survives" the processing performed by the HSR logic 120 this means that the fragment is not removed (i.e. not discarded) by the processing performed by the HSR logic 120.

In step S208 the processing logic 126 executes the first stage of the shader program for the fragment. In step S208, the processing logic 126 does not execute the second stage of the shader program for the fragment. As described above, the first stage of the shader program comprises one or more instructions for determining the presence of the fragment. Therefore, by executing the first stage of the shader program, the processing logic 126 determines the presence of the fragment, i.e. it determines whether or not the fragment is present. If the first stage of the shader program discards the fragment then the fragment is determined to be not present; whereas, if the first stage of the shader program does not discard the fragment then the fragment is determined to be present.

In step S210 it is determined whether the fragment was discarded by the execution of the first stage of the shader program. If the fragment was discarded then the method returns to step S204 to process another fragment (if there is another fragment to process). However, if the fragment was not discarded (i.e. if the execution of the first stage of the shader program determined that the fragment is present) then the method passes to step S212.

In step S212 the hidden surface removal logic 120 performs further processing of the fragment on the basis that the fragment is present. The further processing performed by the HSR logic 120 comprises performing a depth test on the fragment. Similarly to as described above, the depth test involves comparing the depth value of the fragment with a depth value at a corresponding sample position from the depth buffer 122 in accordance with a depth compare mode. If the fragment fails the depth test then it is discarded. Since the presence of the fragment is now known, if the fragment passes the depth test then the depth buffer 122 and the tag buffer 124 are updated. As described above, the depth buffer 122 keeps track of the current visible depth value at each sample position in the tile, and the tag buffer 124 keeps track of an ID of the primitive which is present at each sample position in the tile. The further processing of the fragment in step S212 can be considered to last until a flush is performed on the tag buffer 124. Even if the tag (i.e. primitive ID) of the fragment is added to the tag buffer 124 in response to the fragment passing the depth test in the further processing performed by the HSR logic 120, the fragment might not survive the further processing at the HSR logic 120. This is because after the tag of the fragment has been added to the tag buffer 124, the HSR logic 120 can carry on processing other rasterized fragments and if any of those other fragments are opaque and pass their depth tests then they can overwrite tags stored in the tag buffer 124. If the tag of a fragment is overwritten during the further processing performed by the HSR logic 120 in step S212 then the fragment does not survive the further processing. At some point, the tag buffer 124 is flushed, such that the tags in the tag buffer 124 are sent to the processing logic 126, and the method passes to step S214.

In step S214 it is determined whether the fragment survived the further processing performed by the HSR logic 120. In other words, it is determined whether a tag for the fragment is flushed from the tag buffer 124 to the processing logic 126. If the fragment did not survive the further processing (i.e. if the fragment has been discarded by the further processing) then the method returns to step S204 to process another fragment (if there is another fragment to process). However, if the fragment did survive the further processing then the fragment is provided to the processing logic 126 (as part of the flush of the tag buffer 124) and the method passes to step S216.

In step S216 the processing logic 126 executes the second stage of the shader program for the fragment. For example, the second stage of the shader program may be started from scratch having terminated the execution of the first stage of the shader program. As described in more detail with reference to the flow chart shown in FIG. 3, the first stage of the shader program may, or may not, be re-executed as part of step S216.

In step S218 a rendered value is determined in accordance with a result of executing the second stage of the shader program for the fragment. The result of the execution of the second stage of the shader program for the fragment is a shaded fragment. In some examples, this shaded fragment (i.e. the result of the execution of the second stage of the shader program for the fragment) may be the rendered value itself. In other examples, some further processing may be performed involving the shaded fragment (i.e. further processing may be performed on the result of the execution of the second stage of the shader program for the fragment) in order to determine the rendered value. For example, the shaded fragment may be held in an output register of the processing logic 126 to be overwritten by, or blended with, subsequently shaded fragments which are located at the same sample position, in order to determine a rendered value to be output to the memory 108. Furthermore, in some examples, rendered values may be passed to the PBE 128 where post-processing can be performed to further modify the rendered value. The post-processing may comprise processes such as colour space conversion and rotation, to give just two examples.

It is noted that in the method shown in FIG. 2, if the execution of the first stage of the shader program determines that the fragment is not present (i.e. if the fragment is discarded in the first stage of the shader program) then the second stage of the shader program is not executed for the fragment.

Figure 3:
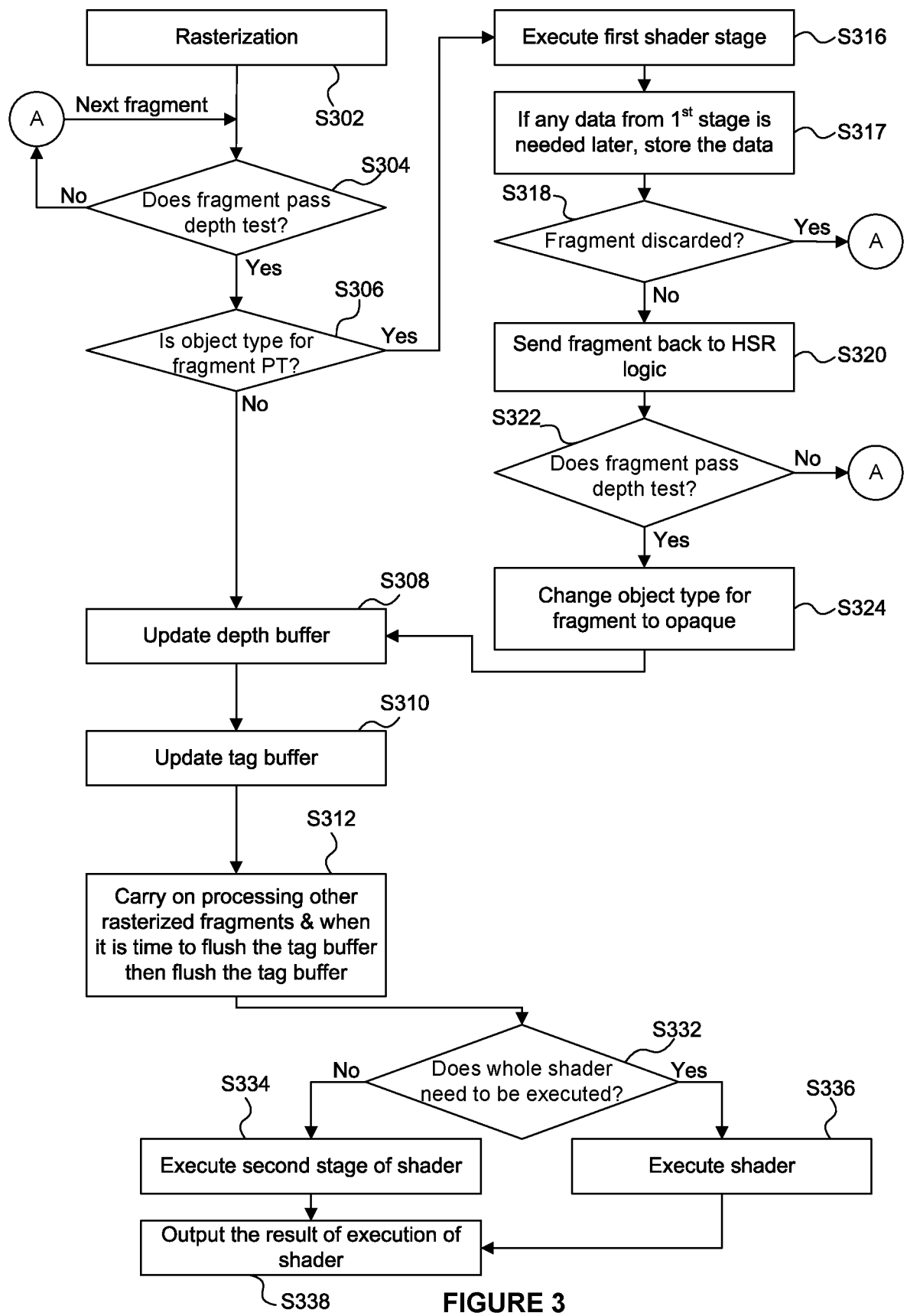
FIG. 3 shows a flow chart for a method of processing fragment in a graphics processing system.

FIG. 3 shows a more detailed flow chart of a method of processing fragments in the graphics processing system 100. The flow chart shown in FIG. 3 shows how the graphics processing system 100 can process fragments which are associated with different object types, e.g. where some of the fragments are punch through fragments (i.e. fragment with shader-dependent presence) and some other fragments are not punch through fragments. A punch through fragment (if it is present) may be opaque or translucent; similarly, a non-punch through fragment may be opaque or translucent. As such, there are four object types: (i) non-punch through opaque (which may sometimes be referred to herein as "opaque"), (ii) non-punch through translucent (which may sometimes be referred to herein as "translucent with known presence" or simply "translucent"), (iii) punch through opaque (which may sometimes be referred to herein as "punch through"), and (iv) punch through translucent (which may sometimes be referred to herein as "translucent with unknown presence"). For the sake of simplicity, translucent fragments (both with known presence and with unknown presence) are not considered as part of the flow chart shown in FIG. 3, but the skilled person, having read the following description of how opaque and punch through (opaque) fragments are processed, would know how to handle translucent fragments in a similar manner.

Prior to starting a render which involves executing shader programs for punch through fragments, the compiler 110 may split the shader program into two stages. For example, the compiler 110 may analyse the shader programs to determine whether (and if so, how) to split the shader program into two stages. The compiled shader programs are stored in the memory 108 and can be fetched from the memory 108 and passed to the processing logic 126 when they are to be executed.

The method shown in the flow chart of FIG. 3 describes processing performed by the rendering logic 106. As mentioned above, in the example tile-based graphics processing system 100 shown in FIG. 1 it is noted that the geometry processing logic 104 will perform geometry processing to determine transformed primitive data and tile control lists, which are then stored in the memory 108 before the processing steps shown in FIG. 3 are performed by the rendering logic 106. The fetch unit 116 fetches the tile control list for a tile from the memory 108 and fetches the transformed primitive data which is indicated in the tile control list for the tile from the memory 108. The transformed primitive data (e.g. vertex data for transformed primitives) is passed to the rasterization logic 118.

In step S302, similarly to in step S202 described above, the rasterization logic 118 performs rasterization (which may be referred to as "scan conversion" or "sampling") on the transformed primitive data to generate fragments at sample positions within the tile that is currently being processed in the rendering logic 106. The fragments are passed to the HSR logic 120. For clarity, the flow chart shown in FIG. 3 illustrates how a fragment is processed, but it is noted that this is a simple example, and in some other examples groups of fragments may be processed in parallel in the HSR logic 120 and in the processing logic 126.

In step S304 the HSR logic 120 performs a depth test on a fragment. As described above, the depth test involves comparing a depth value of the fragment with a depth value at a corresponding sample position from the depth buffer 122 in accordance with a depth compare mode. If the fragment fails the depth test then it is discarded and the method moves on to process another fragment. If the fragment passes the depth test then it is not discarded due to the depth test of step S304. The method then passes to step S306. In step S306 the HSR logic 120 determines whether the fragment is associated with a punch through object type. In other words, the HSR logic 120 determines whether the fragment has shader-dependent presence. If the fragment does not have a shader-dependent presence (i.e. if the fragment has a determined presence, e.g. because it is an opaque fragment) then the method passes to step S308. In the example described with reference to the flow chart of FIG. 3, opaque fragments are described as an example of fragments which are not punch through fragments, but as mentioned above it is to be understood that translucent fragments which have known presence are also not punch through fragments, and a person skilled in the art would be aware of suitable methods of processing translucent fragments.

In step S308 the depth buffer 122 is updated, by writing the depth value of the opaque fragment into the position within the depth buffer 122 which corresponds with the sample position of the fragment. In step S310 the tag buffer 124 is updated, by writing the tag of the opaque fragment (i.e. the primitive ID of the primitive from which the fragment was generated) into the position within the tag buffer 124 which corresponds with the sample position of the fragment. The updating of the depth buffer 122 may involve overwriting a depth value which was previously present in the depth buffer 122. The updating of the tag buffer 124 may involve overwriting a tag which was previously present in the tag buffer 124.

Then in step S312 the HSR logic 120 carries on with processing other rasterized fragments, and when it is time to flush the tag buffer 124 then the tag buffer 124 is flushed, as described in more detail below.

It can be appreciated that the steps performed for an opaque fragment (steps S304 to S310) are relatively simple in comparison to the steps performed for a punch through fragment (steps S304, S306 and S314 to S330) described in more detail below before getting to step S312.

If it is determined in step S306 that the object type for the fragment being processed is punch through then the method passes to step S314. In step S314 the HSR logic 120 determines whether the shader program for the punch through fragment is split into two stages. An indication of whether the shader program is split into two stages is accessible by the HSR logic 120. For example, the HSR logic 120 can access state data associated with the primitives to be processed, and this state data can include information to indicate whether the shader program for a fragment of a primitive is split into two stages.

If the shader program for the fragment is split into two stages then the fragment is provided to the processing logic 126 and in step S316 the processing logic 126 executes the first stage of the shader program for the fragment. In step S316, the processing logic 126 does not execute the second stage of the shader program for the fragment. As described above, the first stage of the shader program comprises one or more instructions for determining the presence of the fragment. Therefore, by executing the first stage of the shader program, the processing logic 126 determines the presence of the fragment, i.e. it determines whether or not the fragment is present. If the first stage of the shader program discards the fragment then the fragment is determined to be not present; whereas, if the first stage of the shader program does not discard the fragment then the fragment is determined to be present.

Figure 4:
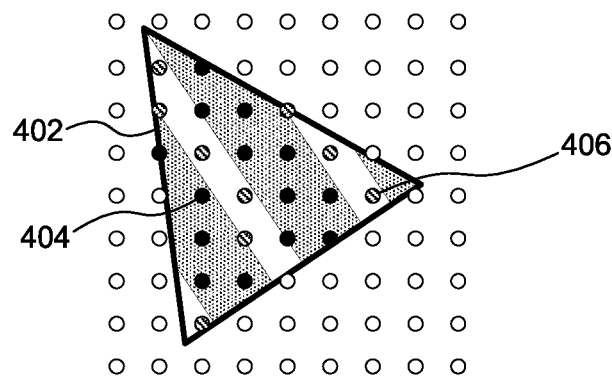
FIG. 4 shows a punch through object positioned within an array of sample positions of a rendering space.

FIG. 4 illustrates a punch through primitive 402 positioned within an array of sample positions of a rendering space. The sample positions are represented as circles in FIG. 4. The first stage of the appropriate shader program is executed for the fragments of the primitive 402 (which are positioned where the primitive 402 overlaps with the sample positions). The first stage of the shader program for a fragment of primitive 402 includes a discard instruction, the execution of which is conditional on applying a texture to the fragment and using the alpha value of the texture to determine whether or not to discard the fragment. The texture, as applied to the primitive 402, is represented by the clear and dark strips on the primitive 402, wherein the clear strips represent holes in the primitive and the dark strips represent opaque portions of the primitive. This texture could, for example, be used to represent a picket fence in a scene. Fragments of the primitive 402 which are determined to be present (e.g. fragment 404), because the primitive is opaque at the corresponding sample positions, are shown as black circles in FIG. 4. Fragments of the primitive 402 which are determined to be not present (e.g. fragment 406), because the primitive has a hole at the corresponding sample positions, are shown as circles with diagonal hatching in FIG. 4.

In step S317 the processing logic 126 may store some data from the first stage of the shader program. As described in more detail below, the compiler 110 can determine whether data generated in the first stage of the shader program will be used in the execution of the second stage of the shader program. If data from the first stage of the shader program (e.g. data generated during the execution of the first stage of the shader program) is used in the execution of the second stage of the shader program then that data may be stored, e.g. in a local memory (e.g. in one or more registers) on the GPU 102. As described below, this stored data may be retrieved when the second stage of the shader program is executed. In some examples, no data from the first stage of the shader program is needed during the execution of the second stage of the shader program, in which case there may be no data stored in step S317. Furthermore, even if data from the first stage of the shader program is used in the second stage of the shader program, this data might not be stored in step S317, and instead the first stage of the shader program may be re-executed in order to regenerate the data when the second stage of the shader program is to be executed. This is explained in more detail below.

Returning to FIG. 3, in step S318 it is determined whether the fragment was discarded by the execution of the first stage of the shader program. If the fragment was discarded then the method returns to step S304 to process another fragment (if there is another fragment to process). However, if the fragment was not discarded (i.e. if the execution of the first stage of the shader program determined that the fragment is present) then the method passes to step S320. In step S320 the processing logic 126 sends surviving fragments (i.e. fragments which have not been discarded) back to the HSR logic 120. The discarded fragments are forgotten. The task in the processing logic 126 terminates.

In step S322 the HSR logic performs another depth test on the fragment. Similarly to as described above, the depth test of step S322 involves comparing a depth value of the fragment with a depth value at a corresponding sample position from the depth buffer 122 in accordance with a depth compare mode. The depth values in the depth buffer 122 might change (due to the processing of other fragments) between performing the depth test of step S304 on the fragment and performing the depth test of step S322 on the fragment. Therefore, it is possible that the results of the depth tests performed in steps S304 and S322 are different. If the fragment fails the depth test of step S322 then it is discarded and the method passes back to step S304 to process another fragment (if there is one). If the fragment passes the depth test of step S322 then it is not discarded due to the depth test of step S322, and the method then passes to step S324.

The presence of the fragment is now known (due to the execution of the first stage of the shader program). In step S324, the HSR logic 120 changes the object type for the fragment from punch through to opaque, so that the HSR logic 120 will then process the fragment on the basis that it is present. In other words, the HSR logic 120 sets an object type for the fragment to be opaque for further processing of the fragment in the HSR logic 120. As mentioned above, the example described with reference to the flow chart shown in FIG. 3 relates to the case where present fragments of a punch through primitive are opaque, but a similar process could be performed where at least one of the present fragments of a punch through primitive is translucent (now with known presence). Fragments of a punch through primitive which are determined to be translucent can be processed in a manner in which translucent fragments are processed in the graphics processing system 100, which is not described in detail herein, but would be known to a person skilled in the art.

After step S324, the fragment is treated as an opaque fragment, and the method passes to step S308 in which the depth buffer is updated as described above. Following step S308, the tag buffer is updated in step S310 as described above.

The method then passes to step S312, in which the HSR logic 120 carries on with processing other rasterized fragments, and when it is time to flush the tag buffer 124 then the tag buffer 124 is flushed. In particular, after the depth buffer 122 and the tag buffer 124 have been updated, the HSR logic 120 can process subsequent fragments, e.g. by performing depth tests on the subsequent fragments and updating the depth buffer 122 and the tag buffer 124 based on the results of the depth tests on the subsequent fragments. At some point, the HSR logic 120 may determine that the tag buffer 124 should be flushed, and in response thereto, the tag buffer 124 is flushed. The flushing of the tag buffer 124 involves sending data from the tag buffer 124 to the processing logic 126 to cause second stages of shader programs (and maybe also first stages of shader programs) to be executed at the processing logic 126 for fragments indicated by the data sent from the tag buffer 124. This is described in more detail below with reference to steps S332, S334 and S338.

There are a number of different situations in which the tag buffer 124 should be flushed. To give some examples, the HSR logic 120 may determine that the tag buffer 124 should be flushed if it determines that:
   all of the fragments for a portion (e.g. a tile) of the rendering space have been processed by the HSR logic 120; or
   a translucent fragment is overlapping a fragment identified in the tag buffer 124.

When the tag buffer 124 is flushed then the method passes to step S332. The method shown in FIG. 3 does not pass to step S332 before the tag buffer is flushed. Therefore, the use of the tag buffer 124 can provide some deferral in the execution of the second stages of the shader programs at the processing logic 126 until at least some of the processing has been performed at the HSR logic 120. This means that the graphics processing unit 102 can avoid executing the second stages of the shader programs for at least some of the fragments if those fragments will not contribute to the final rendered values (e.g. if those fragments are occluded). For example, if a particular punch through fragment passes the depth tests at the HSR logic 120 and is found to be present by the execution of the first stage of the shader program then the tag for the particular fragment is written into the tag buffer 124. However, a subsequent opaque fragment may occlude the particular fragment, such that the tag for the particular fragment may be overwritten in the tag buffer 124 before the tag buffer is flushed. Therefore, the second stage of the shader program for the particular fragment would never be executed. This avoids the unnecessary processing of executing the second stage of the shader program at the processing logic 126 for the punch through fragment which is ultimately occluded by the subsequent opaque fragment. It is noted that the second stage of the shader program often includes most of the complex operations of the shader program, such as texture sampling and reciprocal square root operations to give just two examples. In other words, discard instructions (which determine where the first stage of a shader program ends and the second stage of the shader program begins) tend to occur near the start of shader programs; in particular, they tend to occur before most of the instructions involving complex operations in a shader program.

In step S332 the processing logic 126 determines whether the whole shader program needs to be executed for a fragment or if only the second stage of the shader program needs to be executed for the fragment. For example, step S332 can determine that the whole shader program does not need to be executed for the fragment, i.e. only the second stage of the shader program needs to be executed, if: (i) no data from the first stage of the shader program is used in the execution of the second stage of the shader program for the fragment, or (ii) any data from the first stage of the shader program which is used in the execution of the second stage of the shader program for the fragment was stored in step S326 (and is still available for retrieval). To give some other examples, step S332 can determine that the whole shader program does need to be executed for the fragment if: (i) none of the shader program has been previously executed for the fragment (e.g. for opaque fragments, which were always opaque, the first stage of the shader program has not been previously executed for the fragment); or (ii) the first stage of the shader program is to be re-executed for the fragment because data from the first stage of the shader program is needed in the second stage of the shader program, but that data was not stored in step S326 (or is no longer available for retrieval).

If it is determined in step S332 that the whole shader program does not need to be executed for the fragment, i.e. only the second stage of the shader program needs to be executed for the fragment, then the method passes to step S334. In step S334 the processing logic 126 executes the second stage of the shader program for the fragment, thereby determining a shaded fragment. Following step S334 the method passes to step S338 described below.

If it is determined in step S332 that the whole shader program does need to be executed for the fragment then the method passes from step S332 to step S336. In step S336 the processing logic 126 executes the whole shader program for the fragment, thereby determining a shaded fragment. If the fragment was originally a punch through fragment then step S336 may involve re-executing the first stage of the shader program and then executing the second stage of the shader program. If the fragment was not originally a punch through fragment then step S336 may involve executing the whole shader program for the fragment for the first time. Following step S336 the method passes to step S338.

In step S338 the result of the execution of the shader program for the fragment (i.e. the shaded fragment) is outputted. For example, the shaded fragment may be stored in an output register of the processing logic 126. In some examples blending with previously outputted shaded fragments which are located at the same sample position may occur as part of the execution of the shader program for the fragment, while in other examples the shaded fragment may be outputted to a blending unit. In this way a rendered value may be determined from one or more shaded fragments. Rendered values may subsequently be passed to the PBE 128. The PBE 128 can apply post-processing to further modify the rendered value. The post-processing applied by the PBE 128 may comprise processes such as colour space conversion and rotation, to give just two examples. As described above, in some examples, a post-processing step might not be performed on the results of the shader programs. In these examples, the result of the execution of the second stage of the shader program for the fragment may be the rendered value itself. In general, a rendered value may be determined in accordance with the result of executing the second stage of the shader program for the fragment. The rendered values can be outputted from the GPU 120 and, for example, stored in the memory 108, e.g. in a frame buffer within the memory 108.

Of course, some systems may choose to implement the novel punch through logic described herein alongside a more conventional system (e.g. as described in the background section). The compiler 110 might not necessarily split a shader program for a punch through fragment into multiple stages. In some situations, the compiler 110 may determine that the shader program for a punch through fragment should not be split into multiple stages, for example if most of the processing work specified in the shader program occurs before the final discard instruction and/or if lots of data calculated with instructions before the final discard instruction is used after the final discard instruction in the shader program. The analysis of the shader program performed by the compiler 110 includes determining whether any data from the first stage of the shader program is used in the second stage of the shader program. In this way, the compiler 110 may determine whether data generated by an instruction before the final discard instruction in the shader program is used after the final discard instruction in the shader program. If the compiler does split the shader program for a punch through fragment into multiple stages then the novel punch through logic described herein can be used; whereas if the compiler does not split the shader program for a punch through fragment into multiple stages then the conventional system can be used.

It can be appreciated that, in the methods described with reference to the flow charts shown in FIGS. 2 and 3, splitting the shader program for a punch through fragment into two stages, means that the presence of a punch through fragment can be determined by the processing logic 126 without introducing as much latency, as compared to a system in which the shader programs are not split into multiple stages. For example, the processing logic 126 only allocates enough resources to execute the first stage of the shader program (rather than the whole shader program) in order to determine the presence of the fragment. In particular, because the first stage of the shader program is terminated after it has finished executing the resources of the processing logic 126 (e.g. registers) are freed up to be used for the execution of other tasks. Furthermore, it is noted that the use of a tag buffer (which may also be referred to as a "deferred buffer") on the second pass (when the fragments are not treated as punch through fragments) rather than on the first pass (where the fragments are treated as punch through fragments) provides more opportunities for fragments to be culled by the HSR logic 120 due to occlusion. This means that for some of the punch through fragments, which are determined to be present as a result of the execution of the first stage of the shader program, the second stage of the shader program might not be executed, e.g. if the fragment is occluded by a subsequent fragment, and therefore overwritten in the tag buffer before the tag buffer is flushed. This means that the number of punch through fragments, for which the second stage of the shader program is executed, is reduced compared to a system in which the shader programs are not split into two stages. Furthermore, the system described herein may result in better utilisation of the SIMD nature of the processing logic 126 because in the first stage of the shader program most fragments are valid, and for the second stage of the shader program the tasks can comprise only those fragments that are scanned out of the tag buffer (the discarded fragments need not be included in the execution of the second stage of the shader program). Furthermore, the task buffer logic may be simplified because punch through fragments are not included. Overall, these advantages can lead to a reduction in the processing latency and power consumption of the GPU 102, and a reduction in silicon area, compared to a system in which the shader programs are not split into two stages.

In many cases, the order in which fragments are rendered is significant. An example of this is in the processing of translucent fragments, in which translucent primitives are received at the rasterization logic in a particular order (e.g. sorted from most distant to closest), and generate fragments that must be shaded and blended in the same order so as to achieve the correct rendered result. It is important that rendering logic 106 preserves the submission order when rendering these fragments. On the other hand, in the rendering system of FIG. 1, opaque objects do not generally need to be rendered in a particular order, since only one opaque fragment (e.g. the closest) will be visible at each sample location, with all other fragments occluded by it. The visibility of opaque fragments can be resolved entirely within the HSR logic 120, with the same rendered result regardless of the order of processing. Certain exceptions to this basic principle, e.g. changes in depth compare mode, or the use of stencil functions, will be familiar to those skilled in the art, as will the additional precautions required to render correct images.

In addition to the order of processing within a group of, for example, translucent primitives, precautions need to be taken when the object type changes, for example from opaque to translucent, or from translucent to opaque. For example, rules can be applied to the flushing of a tag buffer. If the tag buffer contains a translucent fragment, which is then overlaid by an opaque fragment at the same sample position, the translucent fragment may be replaced in the tag buffer, since it is occluded by the opaque fragment. However, if the tag buffer contains an opaque fragment, which is then overlaid by a translucent fragment, the opaque fragment must be flushed before it is overwritten by the translucent fragment. The opaque fragment is then shaded first, so that the translucent fragment, when it is eventually flushed from the tag buffer and shaded, can be blended with it to produce the correct rendered value. Further precautions must be taken in the scheduling of shading tasks to run on the processing logic 126, to ensure that the opaque fragment shader is never overtaken by the translucent fragment shader, regardless of the dynamic conditions that normally influence shader task scheduling. The person skilled in the art will be familiar with these render ordering requirements, and the techniques used to ensure that they are satisfied.

The introduction to the system of fragments with shader-dependent properties, e.g. presence, further complicates the problem of rendering fragments in the correct order. In particular, the HSR logic 120 may be processing new fragments arriving from rasterization logic 118, at the same time as older fragments returning to the HSR logic in the feedback loop from the processing logic 126. Additional precautions must be taken between punch-through and non-punch-through objects of the same type, for example, between opaque and opaque punch-through objects. For example, in the system described in the background section above, a punch-through fragment does not set the depth buffer when it first arrives at HSR logic 120, so when an opaque fragment is subsequently received, it cannot be determined which one occludes, or potentially occludes (due to unknown presence), the other. By the time the depth and presence of the punch-through fragment are received from the shader, the opaque fragment has been written to the tag buffer and will be rendered, regardless of whether or not it is occluded by the punch-through fragment. Consequently, there exists the potential for rendering errors. Similar situations arise between translucent and translucent-punch through fragments, and there are additional problems in maintaining the correct rendering order of translucent fragments in the light of the additional and variable delays associated with the feedback loop between HSR logic 120 and processing logic 126. Typical solutions to these problems will be familiar to those skilled in the art, and typically involve flushing the tag buffer when the object type changes, stalling the arrival of fragments from the rasterization logic 118 to the HSR logic 120, to ensure that HSR logic 120 does not contain objects of mixed type, and allowing the feedback loop pipeline to drain of fragments returning to the HSR logic 120 for a second depth test, before admitting new fragments of another type from rasterization logic 118. These measures may contribute to a considerable reduction in performance when the rendering logic 106 is processing a mixture of object types including punch-through objects.

The system described in examples herein in which the shader program is split into two stages improves the performance of the system and reduces its complexity by first sending punch-through fragments for the first stage of shading without utilising the tag buffer. Fragments that are not discarded by the first shader stage are converted to the corresponding non-punch-through object type on their return to the HSR logic 120. i.e. opaque punch-through to opaque, and translucent punch-through to translucent. Consequently, the tag buffer never contains the tag of a punch-through object, i.e. one for which presence, or any other shader-dependent property is not yet resolved. Tag buffer flushing and object type mixing rules are therefore simplified, particularly for opaque and opaque punch-through objects. Opaque and opaque punch-through objects may now be mixed, without the need to flush the tag buffer or stall the arrival of new fragments from rasterization logic 118, and visibility is correctly resolved in all circumstances.

Compared to the system described in the background section above, the system described in examples herein in which the shader program is split into two stages also reduces the complexity of processing translucent and translucent punch-through fragments. Previously it was necessary to both flush the tag buffer on each object type change, and to stall the arrival of fragments of a different object type. Now, since translucent punch-through fragments bypass the tag buffer and run the first shader stage immediately, all fragments arriving at the tag buffer are of the translucent type or have been converted from translucent punch-through to translucent. Consequently it is not necessary to flush the tag buffer when the object type changes between translucent and translucent punch-through, and ordering may be maintained by stalling the arrival of translucent fragments until the feedback loop pipeline is drained of translucent punch-through fragments.

As described above, the compiler 110 may analyse the shader program for a fragment to determine whether to split the shader program for the fragment into two stages. The analysis of the shader program performed by the compiler 110 may be performed prior to starting a render which involves executing the shader program. Part of the analysis performed by the compiler 110 may involve determining whether any data from the first stage of the shader program is used in the second stage of the shader program. If no data from the first stage of the shader program is needed in second stage of the shader program then the first and second stages may be executed separately.

If the compiler 110 determines that data from the first stage of the shader program is used in the second stage of the shader program then the method may further comprise:
(i) storing the data from the first stage of the shader program (e.g. in step S326) and retrieving the stored data for use when executing the second stage of the shader program (e.g. in step S334), or
(ii) re-executing the first stage of the shader program when the second stage of the shader program is to be executed (e.g. in step S336).

In some situations, option (i) described above may be preferable over option (ii) because this reduces the amount of processing that needs to be performed. In particular, in option (i) the first stage of the shader program does not need to be re-executed. However, in some other situations, option (ii) described above may be preferable over option (i) because this reduces the amount of memory needed on the GPU 102 and/or the need to access slow off-GPU memory. In particular, in option (ii) the data from the first stage the shader program does not need to be stored in step S326. In option (ii) the first stage of the shader program could be re-executed in an optimised fashion. For example, it is known that the fragment is not discarded by the first stage of the shader program. Therefore, instructions that only contribute to that decision (and not to the results that we need to carry over into the second stage of the shader program), which may include an expensive texture fetch, could be omitted this time In some examples, the compiler 110 decides, prior to starting a render which involves executing the shader program, which of options (i) and (ii) is to be performed.

However, in some other examples, the graphics processing system 100 (e.g. the rendering logic 106) decides, during a render which involves executing the shader program, which of options (i) and (ii) is performed based on current conditions of the graphics processing system 100. For example, the compiler 110 may provide a metric for use by the graphics processing system 100 (e.g. the rendering logic 106) in deciding which of options (i) and (ii) to perform. The current conditions of the graphics processing system 100 may comprise a current usage of registers which are configured to store data from the first stage of the shader program. For example, the compiler 110 may provide a metric which specifies a threshold amount of available space in registers of the rendering logic 106 which are able to store data generated during the first stage of the shader programs. Then during the render, step S326 can involve the rendering logic 106 (e.g. the HSR logic 120) determining whether the current available space in the registers of the rendering logic 106 is greater than the threshold amount of available space specified by the compiler 110. If the current available space in the registers is greater than the threshold then the data generated during the first stage of the shader program may be stored in step S326 and then in step S332 it can be determined that only the second stage of the shader program needs to be executed (i.e. step S334 is performed rather than step S336). However, if the current available space in the registers is less than the threshold then the data generated during the first stage of the shader program might not be stored in step S326 and then in step S332 it can be determined that the whole shader program needs to be executed (i.e. step S336 is performed rather than step S334).

The current available space in the registers is just an example of a current condition of the graphics processing system 100 which may be taken into account when deciding whether to perform option (i) or option (ii) described above. Other current conditions of the graphics processing system 100, which may be dynamic (i.e. which may change over time during the course of performing a render), can be taken into account when making this decision. For example, another condition which may be taken into account is the current workload on the processing logic 126. If the processing logic 126 has a high current workload (e.g. higher than a threshold workload specified by the compiler 110 or specified by firmware or hardware, e.g. based on metrics from the compiler and/or the current state of the system), then the rendering logic 106 may decide to take option (i) in step S326, i.e. it may decide to store the data from the first stage of the shader program so that the processing logic 126 does not need to re-execute the first stage of the shader program. However, if the processing logic 126 has a low current workload (e.g. lower than the threshold workload specified by the compiler 110), then the rendering logic 106 may decide to take option (ii) in step S326, i.e. it may decide not to store the data from the first stage of the shader program so that the processing logic 126 does re-execute the first stage of the shader program when the second stage of the shader program is to be executed. The graphics processing system 100 may decide whether to perform option (i) or option (ii) based on one or more current conditions of the graphics processing system 100.

The flow chart of FIG. 3 provides a more detailed description of the method shown in the flow chart of FIG. 2 in respect of how a punch through fragment is processed. It is noted that the depth test performed in step S304 shown in FIG. 3 corresponds with the initial processing performed by the HSR logic 120 shown in step S204 in FIG. 2. Steps S316 and S318 shown in FIG. 3 correspond with steps S208 and S210 shown in FIG. 2. The further processing described with reference to steps S212 and S214 in the flow chart shown in FIG. 2 corresponds with steps S320, S322, S324, S326, S328, S330 and S312 in the flow chart shown in FIG. 3. The execution of the second stage of the shader program in step S216 in the flow chart shown in FIG. 2 corresponds with either steps S332 and S334 or with steps S332 and S336 shown in FIG. 3. Step S338 shown in FIG. 3 corresponds with step S218 shown in FIG. 2.

In summary of the examples described above, the shader program for a punch through fragment may be split into two stages: a first stage (which may be called a "discard stage") and a second stage (which may be called an "after discard stage"). The compiler 110 can perform the splitting of the shader program into stages. For punch through fragments which pass an initial depth test in the HSR logic 120, the first stage (i.e. the discard stage) of the shader program is executed. The presence of the fragments is known after the execution of the first stage (i.e. the discard stage) of the shader program. A second depth test can be performed on the fragments that are not discarded by the discard stage of the shader program, and the depth buffer 122 is updated for the fragments that pass this second depth test. The feedback loop between the processing logic 126 and the HSR logic 120 is shortened (compared to a system which does not split the shader program into multiple stages), e.g. because the first pass for a punch through fragment does not involve the tag buffer.

Any punch through fragments which are not discarded by the execution of the first stage (i.e. the discard stage) of the shader program will then be treated as non-punch through fragments (e.g. treated as opaque or translucent fragments with known presence). These fragments can then be stored in the tag buffer 124 (which may be called the "deferred buffer"). The flushing rules which are normally applied to opaque and translucent fragments with known presence are applied for the tag buffer 124, and no further feedback pass between the processing logic 126 and the HSR logic 120 is needed because the fragments are no longer associated with the punch through object type. Therefore, for opaque punch through primitives, overlapping fragments can be overwritten in the tag buffer 124. Therefore, fewer fragments are processed with the second stages of the shader programs in the processing logic 126 (compared to if the shader programs were not split into multiple stages), so the performance of the GPU 102 is improved (i.e. the latency and power consumption of the GPU 102 is improved).

For many shader programs the workload of the instructions in the second shader stage is larger than the workload of the instructions in the first shader stage because the second stages often involve expansive instructions, e.g. texture load instructions. Even for other shader programs in which the workload of the instructions in the second shader stage is not larger than the workload of the instructions in the first shader stage, the second shader stage still represents additional workload over that of just the first shader stage. The splitting of the shader program into two stages means that the instructions of the second stage are not executed in order to determine the presence of the punch through fragments, and so the feedback pass between the processing logic 126 and the HSR logic 120 is faster than the feedback pass would be if the shader program was not split into two stages. Also, the number of times that the second stages of the shader programs, which may include heavy shader instructions (i.e. instructions which involve a relatively large amount of processing), are executed is reduced due to the possibility of the fragments being overwritten in the tag buffer 124 before the fragments are flushed from the tag buffer 124.

In the examples described above, the rendering logic 106 processes one tile at a time, i.e. it has one tile "in flight" at any given time. However, in other examples, the rendering logic 106 could have multiple tiles in flight. If the processing of a first tile of the tiles in flight stalls then the rendering logic 106 may be able to process a different tile of the tiles in flight until the processing of the first tile is no longer stalled. For example, the processing of the first tile in the processing logic 126 may involve a texture fetch, and while the processing logic 126 is waiting for the texture data to be returned it can be processing a different tile.

GPUs can be designed with the aim of optimizing (e.g. in terms of reducing the size of the hardware, reducing the power consumption and/or increasing the processing performance) the way in which the GPU processes typical graphics workloads and other types of workloads which can benefit from highly-parallelized processing. Therefore, many of the logic blocks and units in a GPU can be implemented in dedicated hardware, e.g. using fixed-function circuitry, rather than being implemented in software. Hardware implementations tend to provide higher processing performance (e.g. reduced latency) than software implementations. However, hardware implementations are inflexible in the sense that once they have been manufactured their functionality is difficult to adjust. A good trade-off can be found in the rendering logic 106 of the GPU 102 by implementing the rasterization logic 118 and the HSR logic 120 in fixed-function hardware, since the desired function of these logic block does not tend to vary, but the shader programs can be implemented in software which is executed on the processing logic 126 (where the processing logic 126 may be a SIMD processing unit) to allow flexibility in the functionality implemented by the shader programs.

As mentioned above, the examples described in detail above relate to fragments which have shader-dependent presence. However, more generally, corresponding techniques could be used to process fragments which have shader-dependent properties. The shader dependent properties are dependent upon the execution of the shader program and are relevant for the processing performed by the hidden surface removal logic. Another example of a shader-dependent property is shader-dependent depth. In particular, a fragment may have a shader-dependent depth, which means that the depth of the fragment can be altered by the execution of the shader program. These fragments can be processed in a similar manner to the way in which fragments with shader-dependent presence are processed in the examples described in detail above. In particular, when processing a fragment with shader-dependent depth, the rendering logic 106 can make use of the same double depth test loop as described above, but with some precautions to ensure that the first depth test is always passed. A shader program to be executed for a fragment with shader-dependent depth may include an instruction for modifying the depth of a fragment. The shader program can be split (e.g. by the compiler) into two stages at a point after (e.g. immediately after) the instruction for modifying the depth of the fragment. Then when the fragment with shader-dependent depth is processed, initial processing can be performed (similar to step S204), and if the fragment survives the initial processing then the first stage of the shader program can be executed (similar to step S208) in order to determine the depth of the fragment. When the depth of the fragment has been determined then further processing can be performed at the HSR logic (similar to step S212), based on the known depth of the fragment. If the fragment survives the further processing then the second stage of the shader program can be executed (similar to step S216), and the result of the execution of the second stage of the shader program (i.e. the shaded fragment) can be used to determine a rendered value (similar to step S218) which can then be output to a memory. In this way, the two stages of the shader program can be executed separately as described above for the punch through fragments. Splitting the shader program for the fragments with shader-dependent depth into stages to be executed separately would have the same benefits as described above in relation to splitting the shader program for the punch through fragments into stages to be executed separately.

Figure 7:
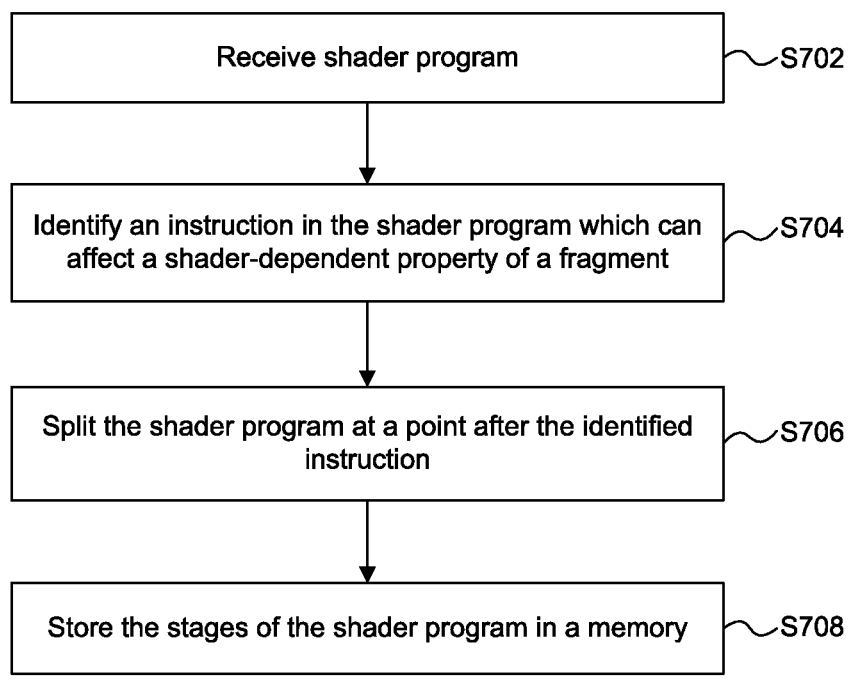
FIG. 7 is a flow chart for a method of analysing a shader program which is for execution in a graphics processing system.

FIG. 7 is a flow chart for a method that can be performed by a complier (e.g. the compiler 110 shown in FIG. 1) for splitting a shader program into stages. In particular, this is a method of analysing a shader program which is for execution in a graphics processing system which comprises: (i) hidden surface removal logic configured to perform hidden surface removal on fragments, and (ii) processing logic configured to execute shader programs for fragments. One or more of the fragments has a shader-dependent property (e.g. shader-dependent presence or shader-dependent depth). The method shown in FIG. 7 may be performed prior to starting a render which involves executing the shader program on the graphics processing system.

In step S702 the shader program is received at the compiler. In step S704 the compiler identifies an instruction in the shader program which can affect the shader-dependent property of a fragment. For example, where the shader-dependent property is shader-dependent presence, then the instruction which can affect the shader-dependent presence is a discard instruction. As another example, where the shader-dependent property is shader-dependent depth, then the instruction which can affect the shader-dependent depth is an instruction for modifying the depth of a fragment.

In step S706 the compiler splits the shader program into stages by splitting the shader program at a point after the identified instruction in the shader program. For example, the shader program may be split into two stages, and the identified instruction may be the final instruction in the shader program which can affect the shader-dependent property of a fragment. The point at which the shader program is split may be a point immediately after the identified instruction in the shader program.

In step S708 the stages of the shader program are stored in a memory (e.g. in memory 108). The graphics processing system can read the stages of the shader program from the memory. For example, the graphics processing system might be able to read the stages of the shader program from the memory separately.

As described above, the compiler may determine whether any data from a first stage of the shader program is used in a second stage of the shader program. In some examples, if data from the first stage of the shader program is used in the second stage of the shader program then, during execution of the shader program by the graphics processing system, either: (i) said data from the first stage of the shader program is stored, and said stored data is retrieved for use when executing the second stage of the shader program, or (ii) the first stage of the shader program is re-executed when the second stage of the shader program is to be executed. If the compiler determines that data from the first stage of the shader program is used in the second stage of the shader program then the method performed by the compiler may further comprise deciding, prior to starting a render which involves executing the shader program, which of options (i) and (ii) is to be performed by the graphics processing system. Alternatively, if the compiler determines that data from the first stage of the shader program is used in the second stage of the shader program then the method performed by the compiler may further comprise providing a metric for use by the graphics processing system in deciding, during runtime, which of options (i) and (ii) to perform.

Figure 5:
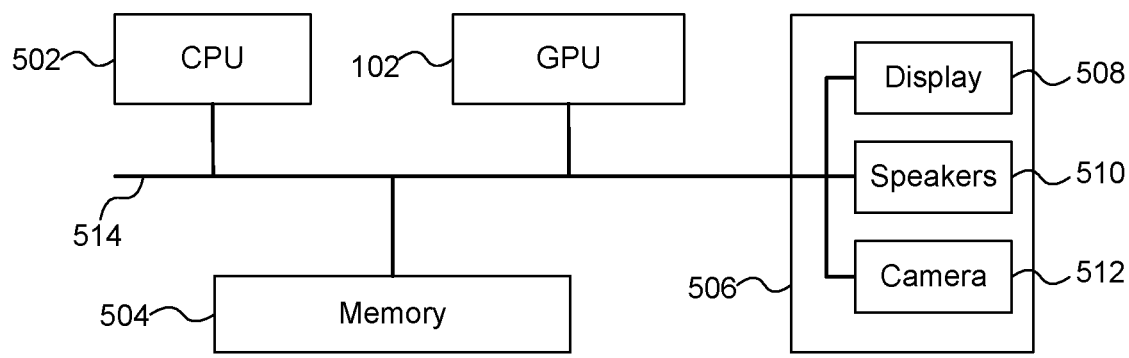
FIG. 5 shows a computer system in which a graphics processing system is implemented.

FIG. 5 shows a computer system in which the graphics processing systems described herein may be implemented. The computer system comprises a CPU 502, the GPU 102, a memory 504 and other devices 506, such as a display 508, speakers 510 and a camera 512. The components of the computer system can communicate with each other via a communications bus 514. At least part of the memory 504 may be used as the memory 108 described above.

The graphics processing system 100 is described herein as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be performed in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 6.

Figure 6:
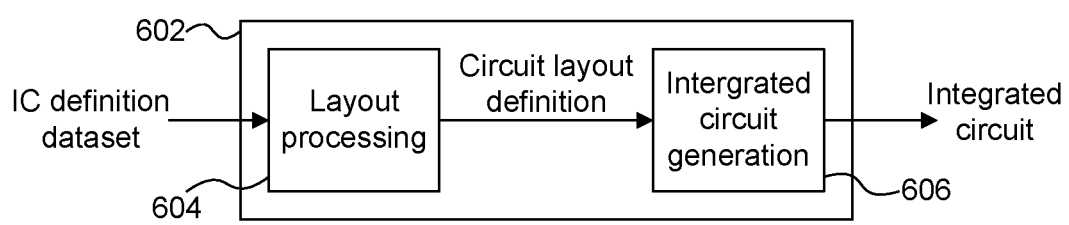
FIG. 6 shows an integrated circuit manufacturing system for generating an integrated circuit embodying a graphics processing unit as described herein.

FIG. 6 shows an example of an integrated circuit (IC) manufacturing system 602 which is configured to manufacture a graphics processing unit as described in any of the examples herein. In particular, the IC manufacturing system 602 comprises a layout processing system 604 and an integrated circuit generation system 606. The IC manufacturing system 602 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 602 to manufacture an integrated circuit embodying a graphics processing unit as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing fragments in a graphics processing system which comprises: (i) hidden surface removal logic configured to perform hidden surface removal on fragments, and (ii) processing logic configured to execute shader programs for fragments, the method comprising:
performing initial processing of fragments at the hidden surface removal logic, wherein one or more of the fragments have a shader-dependent property, wherein a shader program for a particular one of the one or more fragments having the shader-dependent property is split into two stages, and wherein said initial processing comprises performing a depth test on said particular fragment which has the shader-dependent property; and
in response to the particular fragment passing the depth test of the initial processing in the hidden surface removal logic, executing a first stage, but not a second stage, of the shader program for the particular fragment at the processing logic, wherein the first stage of the shader program comprises one or more instructions for determining the property of the particular fragment.

2. The method of claim 1, further comprising:
performing further processing of the particular fragment at the hidden surface removal logic in accordance with the determined property of the particular fragment determined by the execution of the first stage of the shader program; and
if the particular fragment survives the further processing in the hidden surface removal logic, executing the second stage of the shader program for the particular fragment at the processing logic, wherein a rendered value is determined in accordance with a result of executing the second stage of the shader program for the particular fragment.

3. The method of claim 2, wherein the further processing of the particular fragment at the hidden surface removal logic comprises:
performing a depth test on the particular fragment, and
if the particular fragment passes the depth test, updating a depth buffer and a tag buffer which are to be used by the hidden surface removal logic to process subsequent fragments.

4. The method of claim 3, wherein the further processing of the particular fragment at the hidden surface removal logic further comprises:
processing the subsequent fragments by performing depth tests on the subsequent fragments and updating the depth buffer and the tag buffer based on the results of the depth tests on the subsequent fragments,
determining that the tag buffer should be flushed, and in response thereto, flushing the tag buffer thereby sending data from the tag buffer to the processing logic to cause second stages of shader programs to be executed at the processing logic for fragments indicated by the data sent from the tag buffer.

5. The method of claim 4, wherein said determining that the tag buffer should be flushed comprises:
determining that all of the fragments for a portion of a rendering space have been processed by the hidden surface removal logic; or
determining that a translucent fragment is overlapping a fragment identified in the tag buffer.

6. The method of claim 2, further comprising setting an object type for the particular fragment to be opaque or translucent with known presence for said further processing of the particular fragment in the hidden surface removal logic.

7. The method of claim 2, wherein the shader-dependent property is shader-dependent presence, said performing further processing of the particular fragment at the hidden surface removal logic in accordance with the determined property of the particular fragment determined by the execution of the first stage of the shader program comprising:
if the execution of the first stage of the shader program determines that the particular fragment is present, performing further processing of the particular fragment at the hidden surface removal logic on the basis that the particular fragment is present.

8. The method of claim 7, wherein if the execution of the first stage of the shader program determines that the particular fragment is not present then the second stage of the shader program is not executed for the particular fragment.

9. The method of claim 1, wherein the initial processing at the hidden surface removal logic does not comprise updating a depth buffer or a tag buffer based on the result of the depth test performed on the particular fragment in the initial processing at the hidden surface removal logic.

10. The method of claim 1, wherein the shader-dependent property is shader-dependent depth.

11. The method of claim 1, wherein the shader program for the particular fragment is split at a point after a final instruction in the shader program which can affect the shader-dependent property of a fragment.

12. The method of claim 11, wherein the shader-dependent property is shader-dependent presence and the final instruction which can affect the shader-dependent presence is a discard instruction.

13. The method of claim 11, wherein the shader-dependent property is shader-dependent depth and the final instruction which can affect the shader-dependent depth is an instruction for modifying the depth of a fragment.

14. The method of claim 1, wherein a compiler analyses the shader program for the particular fragment to determine whether to split the shader program into two stages.

15. The method of claim 14, wherein the compiler determines whether any data from the first stage of the shader program is used in the second stage of the shader program, wherein if the compiler determines that data from the first stage of the shader program is used in the second stage of the shader program then the method further comprises either:
(i) storing said data from the first stage of the shader program and retrieving said stored data for use when executing the second stage of the shader program, or
(ii) re-executing the first stage of the shader program when the second stage of the shader program is to be executed.

16. The method of claim 15, wherein the compiler decides, prior to starting a render which involves executing the shader program, which of options (i) and (ii) is to be performed.

17. The method of claim 15, wherein the graphics processing system decides, during a render which involves executing the shader program, which of options (i) and (ii) is performed based on current conditions of the graphics processing system, the current conditions of the graphics processing system comprising a current usage of registers which are configured to store data from the first stage of the shader program.

18. A graphics processing unit configured to process fragments, the graphics processing unit comprising:
hidden surface removal logic configured to perform hidden surface removal on fragments, wherein one or more of the fragments have a shader-dependent property; and processing logic configured to execute shader programs for fragments, wherein a shader program for a particular one of the one or more fragments having the shader-dependent property is split into two stages;

wherein the graphics processing unit is configured to:

perform initial processing of fragments at the hidden surface removal logic, wherein said initial processing comprises performing a depth test on said particular fragment which has the shader-dependent property, and execute a first stage, but not a second stage, of the shader program for the particular fragment at the processing logic in response to the particular fragment passing the depth test of the initial processing in the hidden surface removal logic, wherein the first stage of the shader program comprises one or more instructions for determining the property of the particular fragment.

19. The graphics processing unit of claim 18, wherein the graphics processing unit is configured to perform tile-based rendering using a rendering space which is subdivided into a plurality of tiles, the graphics processing unit further comprising:

rasterization logic configured to perform rasterization on primitives to generate the fragments;

geometry processing logic configured to generate, for each of a plurality of tiles, a control list which indicates which of a plurality of primitives are relevant for rendering that tile; and rendering logic comprising said hidden surface removal logic and said processing logic, wherein the rendering logic is configured to receive the control list for a tile and to process the primitives indicated in the control list for the tile using the hidden surface removal logic and the processing logic.

20. A non-transitory computer readable storage medium having stored thereon an integrated circuit definition dataset that, when processed in an integrated circuit manufacturing system, configures the integrated circuit manufacturing system to manufacture a graphics processing unit configured to process fragments, the graphics processing unit comprising:

hidden surface removal logic configured to perform hidden surface removal on fragments, wherein one or more of the fragments have a shader-dependent property; and processing logic configured to execute shader programs for fragments, wherein a shader program for a particular one of the one or more fragments having the shader-dependent property is split into two stages;

wherein the graphics processing unit is configured to:

perform initial processing of fragments at the hidden surface removal logic, wherein said initial processing comprises performing a depth test on said particular fragment which has the shader-dependent property, and execute a first stage, but not a second stage, of the shader program for the particular fragment at the processing logic in response to the particular fragment passing the depth test of the initial processing in the hidden surface removal logic, wherein the first stage of the shader program comprises one or more instructions for determining the property of the particular fragment.

* * * * *